United States Patent [19]

Shepard et al.

[11] Patent Number: 4,666,008
[45] Date of Patent: May 19, 1987

[54] METHODS AND APPARATUS FOR ADAPTING STEERABLE POWERED VEHICLES FOR THE HANDICAPPED TO OUTDOOR TRAVEL

[75] Inventors: Melvin E. Shepard, Bridgeport, Mich.; Elwood P. Gallagher, Albuquerque, N. Mex.

[73] Assignee: Amigo Sales, Inc., Bridgeport, Mich.

[21] Appl. No.: 840,192

[22] Filed: Mar. 17, 1986

[51] Int. Cl.⁴ .................. B62D 61/12; B62B 53/04
[52] U.S. Cl. .................... 180/16; 180/209; 180/907; 280/402
[58] Field of Search ............... 180/907, 198, 209, 15, 180/16, 9.26; 280/402; 414/563

[56] References Cited

U.S. PATENT DOCUMENTS

| | | | |
|---|---|---|---|
| 2,782,076 | 2/1957 | Miller | 180/198 |
| 3,412,820 | 11/1968 | Wachholz | 180/9.26 |
| 3,905,437 | 9/1975 | Kaiho et al. | 180/15 |
| 3,912,032 | 10/1975 | Benz | 180/907 |
| 3,979,137 | 9/1976 | Lipscomb, Jr. et al. | 280/402 |
| 4,147,373 | 4/1979 | Cully | 280/402 |

Primary Examiner—John J. Love
Assistant Examiner—Karin L. Ferriter
Attorney, Agent, or Firm—Learman & McCulloch

[57] ABSTRACT

A steerable, powered, front wheel driven, three-wheeled vehicle for a handicapped person which is movable selectively in a forward or rearward direction and has a vehicle frame supported in part by a pair of transversely spaced rear wheels suitable for indoor travel, is adapted to outdoor use by backing its rear wheels onto a transversely extending, auxiliary frame supported on a pair of transversely spaced driven outdoor wheels. The auxiliary frame has a transversely extending cradle mounted such that, in a first forwardly and downwardly tilted position of the auxiliary wheel frame, the forward portion of the cradle rests substantially on the ground and, in a second position, in which the frame is generally level, the front and rear portions of the cradle are both disposed above the ground, and the rear wheels of the powered vehicle are supported by the cradle above the ground. A latch part mounted by the powered vehicle frame near its rear end is releasably engaged by a cooperative latch member operated responsive to tilting movement of said auxiliary wheel frame from tilted to generally level position to latch the vehicle to the auxiliary frame for travel as an integrated vehicle.

11 Claims, 4 Drawing Figures 4,666,008

METHODS AND APPARATUS FOR ADAPTING STEERABLE POWERED VEHICLES FOR THE HANDICAPPED TO OUTDOOR TRAVEL

BACKGROUND OF THE INVENTION

The present invention relates to auxiliary, wheel supported frames for adapting motorized, steerable three-wheeled vehicles of the type used by the handicapped to outdoor use, and more particularly to a unit upon which the rear wheels of the three-wheeled vehicle may be received in a manner such that they tilt the auxiliary frame to a position in which the rear wheels of the powered vehicle are raised to an inoperative position, and the larger wheels of the auxiliary frame automatically function as the rear support wheels of the powered vehicle.

The invention is further concerned with means which automatically latches the auxiliary frame to the powered vehicle frame with tilting of the auxiliary frame to the operative position.

Front wheel driven, three-wheeled vehicles, wherein a contour chair is supported on a post at the rear end of the vehicle, and a steering post extends upwardly from the front of the vehicle to a position in which it can be readily grasped by the seat occupant are well known and shown, for example, in U.S. Pat. No. 4,452,327, which describes a typical such chair, and its various components. Usually the rear tracking wheels, which are provided for such vehicles are better suited to inside or domestic use in areas where the wheels must be compact, because operating space is often limited, and are neither of a size nor design to perform well on muddy or slick grassy surfaces, for example. To better adopt the powered vehicle to outdoor use, the wider frame of the auxiliary unit which, automatically couples to it in a manner which will be described, provides better stability, and the larger pneumatic wheels provide increased traction and tend to smooth out the ride.

Further, the auxiliary unit normally can be provided with its own battery and motor for driving the treaded pneumatic wheels to provide added power and traction for outdoor use.

SUMMARY OF THE INVENTION

In accordance with one of the prime objects of the present invention, the present mechanism provides an auxiliary frame supported by a pair of transversely spaced outdoor wheels of substantially larger diameter than the rear wheels of the powered vehicle and spaced transversely a substantially greater distance apart. The frame includes a cradle mounted on the auxiliary frame such that in a first forwardly and downwardly tilted position of the auxiliary wheel frame, the front portion of the cradle rests substantially on the ground in the path of the rear wheels of the powered vehicle, and the rear portion is disposed at a level above the ground. When the rear wheels of the powered vehicle are received on the cradle, the auxiliary frame is tilted to a generally level position in which the rear wheels of the powered vehicle are supported by the cradle above the ground and the powered vehicle travels on the larger outdoor wheels of the auxiliary frame.

In accordance with another important object of the invention, a latch is mounted on the powered vehicle frame near the rear end thereof, and a releasable cooperative latch assembly is mounted on the auxiliary frame and is responsive to movement of the auxiliary wheel frame from tilted to generally level position to bring the latch assembly automatically into latched position with the latch member mounted by the powered vehicle frame.

It is an important object of the invention to provide a relatively simple, automatically engaged latching structure for the powered vehicle and the auxiliary frame mounting the outdoor wheels, which is of a simple, reliable nature, and operates reliably automatically in a trouble-free manner to securely lock the auxiliary wheel frame to the powered vehicle frame.

Still another object of the invention is to provide a relatively economically constructed rear wheel mounting auxiliary frame which receives the rear wheels of the powered vehicle and raises them to an out of the way position without unduly jarring the handicapped person sitting on the seat of the powered vehicle, or subjecting the vehicle to undue stress.

A further object of the invention is to design an auxiliary wheeled unit of the character described which readily tracks the powered vehicle and provides its own power to, in effect, provide a three-wheeled vehicle in which each of the three wheels is driven for increased traction and stability during outdoor use.

Still another object of the invention is to provide an auxiliary two-wheeled auxiliary vehicle of the type described for adopting an indoor powered vehicle to outdoor use, which can be relatively economically constructed and sold at an affordable price to owners of such vehicles for the handicapped.

Still a further object of the invention is to provide a smoothly operating, durable auxiliary unit which, in effect, selectively becomes the rear wheels of the powered vehicle.

Other objects and advantages of the invention will be pointed out specifically or will become apparent from the following description when it is considered in conjuncton with the appended claims and the accompanying drawings.

IN THE DRAWINGS

Figure 1:
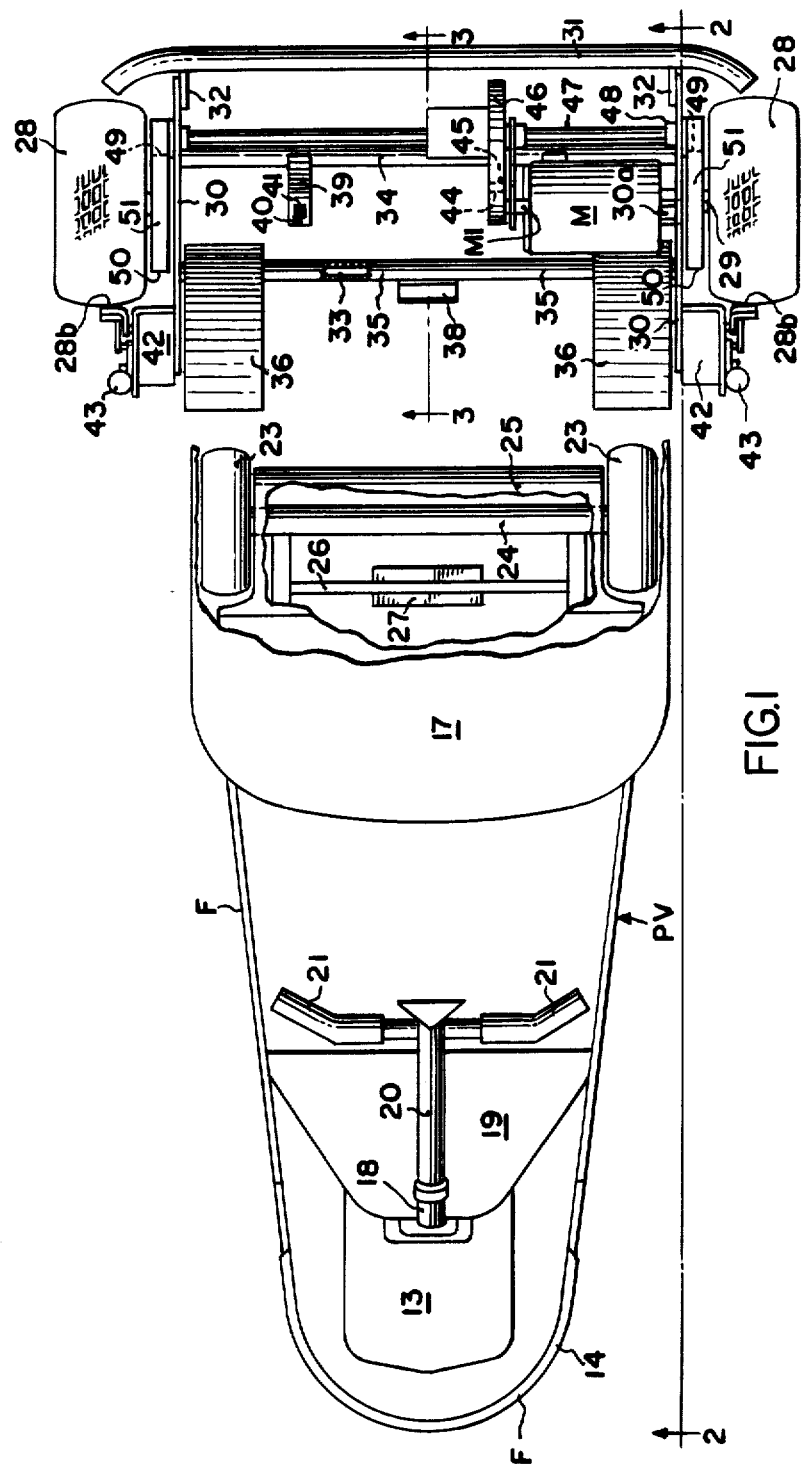
FIG. 1 is a top plan view showing a front wheel driven powered vehicle in position to be driven rearwardly to a position to be received by the frame of a motorized two-wheeled auxiliary unit, parts thereof being broken away to show the position of the latch member on the powered vehicle frame.
Figure 2:
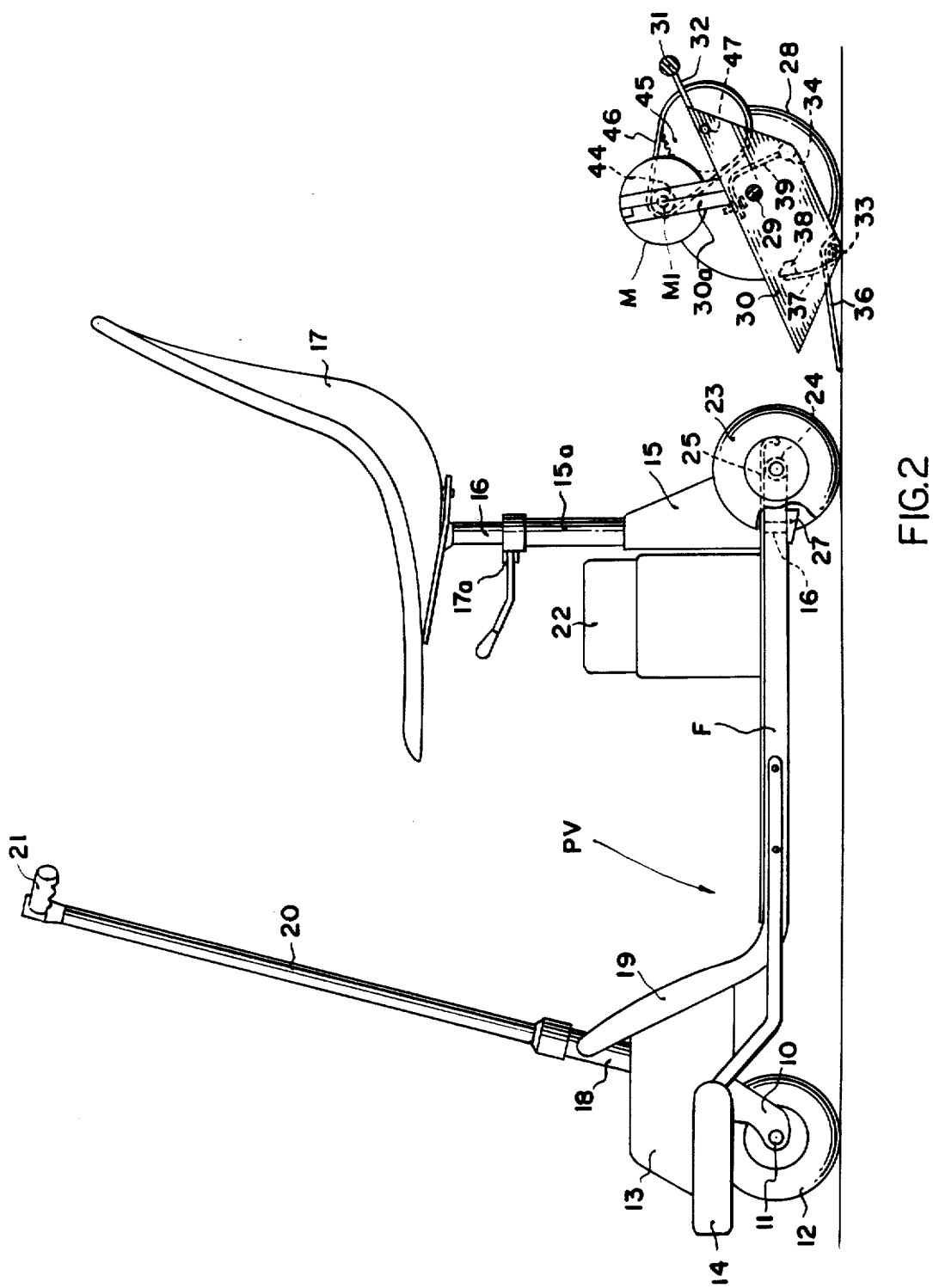
FIG. 2 is a side elevational view of the powered vehicle and the two-wheeled auxiliary unit taken on the line 2—2 of FIG. 1, the latter unit being disposed in a tilted position ready to receive the rear wheels of the powered vehicle.

Referring now more particularly to the accompanying drawings, and in the first instance to FIGS. 1 and 2 thereof, the powered vehicle PV is shown as having a front-to-rear extending, longitudinally disposed frame, generally designated F. Steerable wheel forks 10 support an axle 11, journaling a front wheel 12, which is driven in the usual manner by an electric motor (not shown) housed in a motor housing 13 secured on the upwardly tilted front end of frame F.

Typical mechanism for driving the front wheel 12 of such a vehicle is disposed within housing 13 and disclosed in the U.S. patent mentioned, which is incorporated herein by reference. A front bumper 14 is provided on frame F in the usual manner, and it will be seen that, at the rear of frame F, a seat post-supporting column 15 supports a seat post socket 15a, in which the dependent post 16 of a contour seat 17 is received telescopically. The post 16 is held in vertically adjusted position by a suitable, handle released, latch device generally indicated 17a in the manner illustrated in the aforesaid patent.

A steering socket 18, fixed on frame F, is supported by an upwardly inclined portion 19 thereof, and rotatably receives a steering rod 20 which connects to the wheel forks 10 in a manner to turn wheel 12 in one direction or another when a handicapped person, seated in chair 17, grasps the steering handles 21 and turns the rod 20. Suitable controls for regulating whether the wheel 12 is driven in a forward or reverse direction by the reversible electric motor housed in housing 13, and at what speed, are normally provided adjacent the steering handles 21. The battery 22, which powers the motor housed in housing 13, is supported at the rear end of the powered vehicle in the usual manner.

The non-driven, tracking wheels 23 of the powered vehicle PV are mounted on rear axles, which may be journaled at the rear end of frame F in suitable bearings provided in a frame mounted sleeve 24. It will be seen that the frame F includes a floor plate 25, which extends rearwardly beyond the sleeve 24, and terminates in a downwardly turned edge 25a. A frame bar 26 spans the plate 25, and mounts a centrally disposed, fixed cam plate 27, which has a latch portion 27a projecting forwardly of the stop bar 26, and a rearwardly and downwardly inclined cam surface 27b. Normally, the wheels 23 are hard rubber, non-pneumatic wheels of a diameter which can be readily maneuvered inside an office, home, factory or the like, where operating room is restricted by furniture and other things. Such wheels normally are not pneumatic, and are made of a hard rubber which has little or no tread.

Provided rearwardly of the powered vehicle PV in FIGS. 1 and 2, is an auxiliary wheeled frame unit or vehicle AF which is supported upon pneumatic tread-bearing tires 28 mounted on rims 28a which are fixed to axles 29. The axles 29 are supported by a frame, generally designated F', which includes side plate members 30, to which a rear bumper 31 is fixed by members 32.

The frame plates 30 are connected and braced at their lower ends by rods 33 and 34, located respectively on opposite sides of the axles 29, the rod 33 being located a further distance forwardly of axles 29 than the rod 34 is rearwardly of axles 29.

Figure 4:
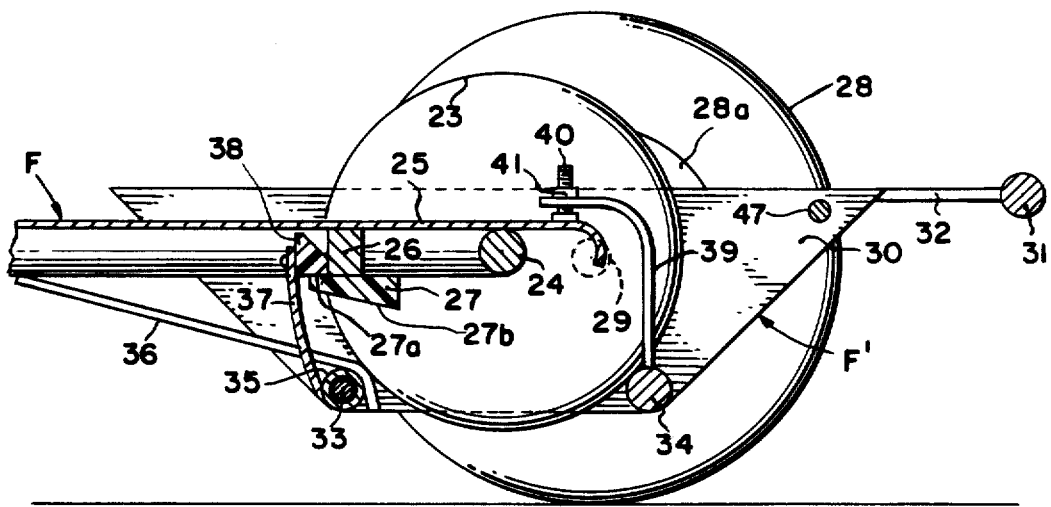
FIG. 4 is a similar, fragmentary view, showing the auxiliary unit tilted to level position, and latched to the frame of the powered vehicle.

As will become apparent, rods 33 and 34 function to provide a cradle for reception of the wheels 23 of the powered vehicle PV in the manner indicated in FIGS. 4 and 5. A tubular rod or sleeve 35, is provided on rod 33 and, as FIG. 4 and FIG. 1 particularly indicates, has a pair of ramp members 36 welded to it, as shown. Also welded to the sleeve 35 is a strap 37 which, at its upper end, mounts a rearwardly projecting latch block 38.

It will be noted that the upper surface of the latch block 38 is reduced by beveling its upper surface as at 38a, and that its lower surface is horizontal as at 38b. It also has a flat front wall portion 38c, perpendicular to the surface 38b. Both the latch block 38 and the cam latch bar 27 may be formed of nylon, or other suitable long-wearing material.

Extending upwardly from the rear cradle bar 34 are rigid straps 39 having forwardly extending portions 39a which extend at right angles to it. The front ends of these straps 39 have openings 39b which are threaded to receive preferably nylon bolts 40, which may be fixed in position by lock nuts 41. When the auxiliary frame is tilted from the FIG. 4 position to the FIG. 5 position, the flat heads 40a of the bolts 40 are brought into abutting engagement with the floor plate 25 of the powered vehicle PV, and hold the auxiliary frame AF in level position. Bolt heads 40a not only prevent the auxiliary frame AF from over-tilting, but also function with latch bar 37, in a manner which will be more particularly described, to maintain the coupled position of the units PV and AF during travel of the units PV and AF as a composite vehicle over terrain which may have some rough spots.

Provided for engagement with the tires 28, are brake shoes 41 which are connected with linkage mounted on brackets 42 secured to the frame F', the linkage being connected with handles 43 which can be swung forwardly or rearwardly to apply or release brake shoes 28b in the conventional manner. Conventional hand-operated brakes which may be used for the wheels 28 are also shown on the powered three-wheeled vehicles disclosed in the aforementioned patent.

A motor M is supported on the frame F' and, as shown in FIG. 1 particularly, motor M can be supported from one of the side plate members 30 by a support member 30a. The shaft of reversible electric motor M is shown at M1, powering a toothed sheave 44, which drives a toothed sheave 45 via a toothed belt 46, which is trained around the sheaves 44 and 45. The hub 45a of sheave 45, is keyed to a drive shaft 47, which is journaled in bearings 48 provided on the side frame members 30, and drives the axles 29. Toothed sheaves 49, provided on each end of drive shaft 47, connect with a toothed sheave 50, provided on each axle 29 via a toothed belt 51, so that motor M can provide the desired tractive power to drive the treaded wheels 28.

While not shown, it is to be understood that the motor M has a suitable control which can be operated to drive it in either direction of rotation. Preferably, its direction of drive, and its speed, will be controlled remotely from the area of handlebars 21, in a manner such that the powered vehicle front wheel 12 and the wheels 28 are powered at the same speed, and in the same direction of travel.

THE OPERATION

Figure 3:
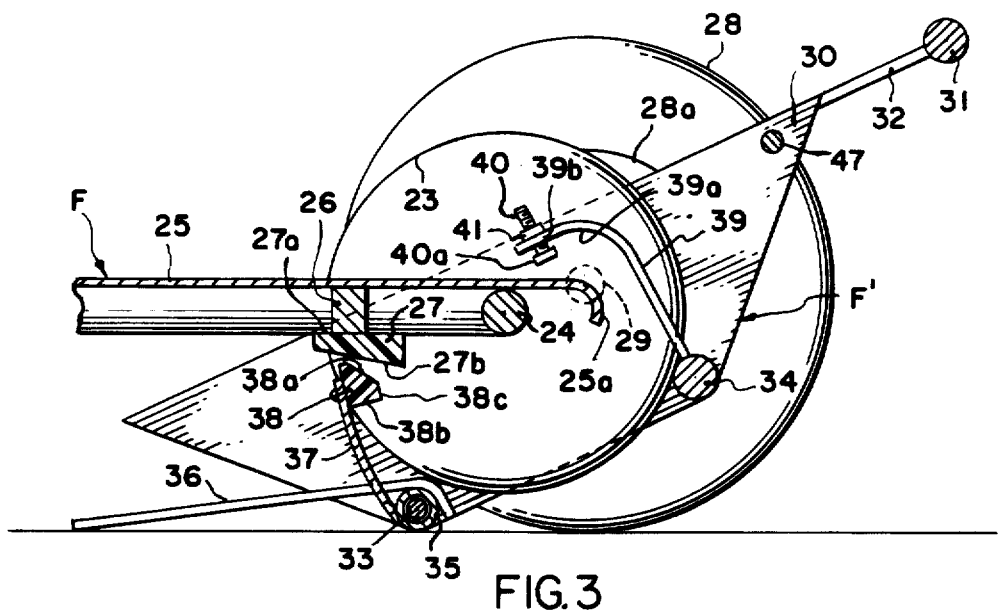
FIG. 3 is an enlarged, sectional, fragmentary elevational view showing the rear wheels of the powered vehicle as initially received by the auxiliary unit.

The auxiliary unit AF is weight-heavy in the forward direction, on the front side of axles 29, so as to normally assume the ready position, shown in FIGS. 2 and 3. In this position of the frame F', the ramps 36 are in engagement with the ground, in front-to-rear alignment with the wheels 23, and the trap block 38, and straps 39 are in the position shown in FIG. 4.

It will be assumed, to begin, that the brake handles 43 have been swung to engage the brake shoes 28b, with tires 28, or that alternately, chock blocks have been placed behind tires 28. As the powered vehicle PV is then moved rearwardly, wheels 23 ride up the ramps 36, and, as they travel over sleeve 35, tend to compress the resilient pneumatic tires 28. When the weight of the rear end of the vehicle PV and the seat occupant is also transferred to the rod 34, the wheels 23 also engaging the rods 34 with some rearward momentum, the frame F' tilts in a clockwise direction in FIG. 4. The rebound of tires 28 assists this tilting movement which causes block 38 to ride up the cam surface 27b, and snap behind the latch projection 27a at the same time that bolt heads 40a engage the floor plate 25 of the powered vehicle frame F. In this position of the parts, the under surface 38b of the block 38 is in engagement with the upper surface of projection 27a and its front surface 38c is in flatwise engagement with the stop bar 26. With the block 38 engaged in the manner disclosed, and the bolts 40 in engagement with the floor plate 25 on the opposite side of axle 24, tilting movement of the auxiliary frame unit AF in either direction is prevented. Rams 36 are, further; maintained by the wheels 23 in the raised, out of the way position shown in FIG. 5. The position of axle 29 and the diameter of tire 28 is such that the frame F remains horizontal in the coupled position.

When it is desired to disengage the units, it is only necessary to lift bumper 31 upwardly from the FIG. 5 to the FIG. 4 position, and, at the same time, push the unit AF forwardly sufficiently for the block 38 to clear the projection 27a as it swings below it.

While one embodiment of the invention has been described in detail, it will be apparent to those skilled in the art that the disclosed embodiment may be modified. Therefore, the foregoing description in all aspects is to be considered exemplary rather than limiting in any way, and the true scope of the invention is that defined in the following claims.

What is claimed is:

1. For use with a steerable, powered front wheel driven, three-wheeled vehicle for a handicapped person, movable selectively in a forward or rearward direction and having a vehicle frame supported in part by a pair of transversely spaced rear wheels suitable for indoor travel in axial alignment a wheel supporting assembly for adapting the vehicle to outdoor travel comprising:
   a. a transversely extending, auxiliary wheel frame;
   b. a pair of transversely spaced, axially aligned, rotatable, outdoor wheels supporting said wheel frame;
   c. transversely extending cradle means, having front and rear portions, mounted on said frame below the axes of said outdoor wheels, said cradle means being mounted on said frame such that, in a first forwardly and downwardly tilted position of said auxiliary wheel frame, the forward portion of said cradle means rests substantially on the ground and the rear portion of said cradle means is disposed at a level substantially above the ground in the path of said rear wheels, and in a second position, in which the frame is generally level, the front and rear portions of the cradle means are disposed above the ground, and the rear wheels of the powered vehicle are supported by the cradle mean above the ground;
   d. latch means adapted to be mounted by said powered vehicle frame near the rear end thereof forwardly of the rear surfaces of said powered vehicle rear wheels; and
   e. a releasable, cooperative latch assembly disposed in a position removed from said latch means operated responsive to tilting movement of said auxiliary wheel frame from tilted to generally level position to bring said latch assembly automatically into latched position with said latch means.

2. The invention defined in claim 1 wherein said front and rear portions of the cradle means comprises spaced apart front and rear rods mounted on said auxiliary wheel frame at a front-to-rear distance apart less than the diameter of said powered vehicle's rea wheels.

3. The invention defined in claim 1 wherein ramp means is mounted on said cradle means to extend forwardly thereof in the path of said powered vehicle rear wheels and engage the ground at its front end when the auxiliary wheel frame is in said first position and inclines at an upward angle to an out of the way position when said auxiliary wheel frame is in said second position.

4. The invention defined in claim 1 wherein said latch assembly includes a member mounted on said cradle means to be swung to a position forwardly of the latch means from beneath it when the auxiliary wheel frame is tilted to said second position.

5. The invention defined in claim 4 wherein said latch assembly includes a member mounted on said auxiliary wheel frame to be swung down to engage the top of the rear end of the powered vehicle frame when the auxiliary wheel frame is tilted to said second position.

6. The invention defined in claim 1 wherein said latch means comprises a cam member adapted to be fixed to the powered vehicle frame at a predetermined distance forwardly of the powered vehicle wheel axes at a predetermined level above the ground and has a downwardly and rearwardly extending cam bottom surface and a forwardly extending latch projection.

7. The invention defined in claim 6 wherein said latch assembly includes a strap, secured to said front portion of the cradle means and having a rearwardly projecting latch block with a cam engaging surface which is positioned to ride upwardly and forwardly on said cam surface when the said auxiliary wheel frame is tilted to said second position and snap to a latched position in which the strap is forward of the latch means and the latch block engages the top surface of the forwardly extending latch projection.

8. The invention defined in claim 7 wherein a stop portion is adapted to be mounted by said frame of the powered vehicle above said latch means and is engaged from the front by said latch block when the auxiliary wheel frame is tilted to said second position.

9. The invention defined in claim 8 wherein a rigid bar fixed to the rear portion of the cradle means extends upwardly and thence forwardly and mounts an abutment member which is in position to engage the top surface of the rear end of the powered vehicle frame when the said auxiliary wheel frame is tilted to said second position.

10. A method of adapting a steerable powered vehicle for a handicapped person which is movable selectively in a forward or rearward direction for outdoor use and comprises a vehicle frame supported in part by transversely spaced rear wheels for travel on a rear wheel supporting assembly comprising a transversely extending, auxiliary wheel frame with a pair of transversely spaced outdoor pneumatic wheels spaced transversely a substantially greater distance apart than said powered vehicle wheels; the auxiliary wheel frame mounting a cradle, having front and rear portions positioned below the axes of said outdoor wheels such that in a first forwardly and downwardly tilted position of said auxiliary wheel frame, the forward position of said cradle is adjacent the ground and the rear portion of the cradle is at a substantially higher level, and in a second position, the said auxiliary wheel frame is generally level, there being a latch member mounted by the powered vehicle frame adjacent its end and a cooperative latch assembly operated responsive to said tilting frame first to second positions to move said latch assembly toward latched position with said latch member; the steps of:
  a. restricting the rearward travel of the wheels of the auxiliary vehicle;
  b. backing the powered vehicle toward the auxiliary vehicle to receive the rear wheels of the powered vehicle on said cradle;
  c. tilting the auxiliary frame from said first to said second position; and
  d. latching the latch member and latch assembly in locked position.

11. The method of claim 10 wherein the weight of the seat occupant on said cradle depresses the pneumatic wheels and their resilience as the auxiliary frame is tilted assists the movement of the latch assembly to latched position.

* * * * *